Oct. 9, 1945. G. A. LYON 2,386,236
WHEEL STRUCTURE
Filed July 12, 1943
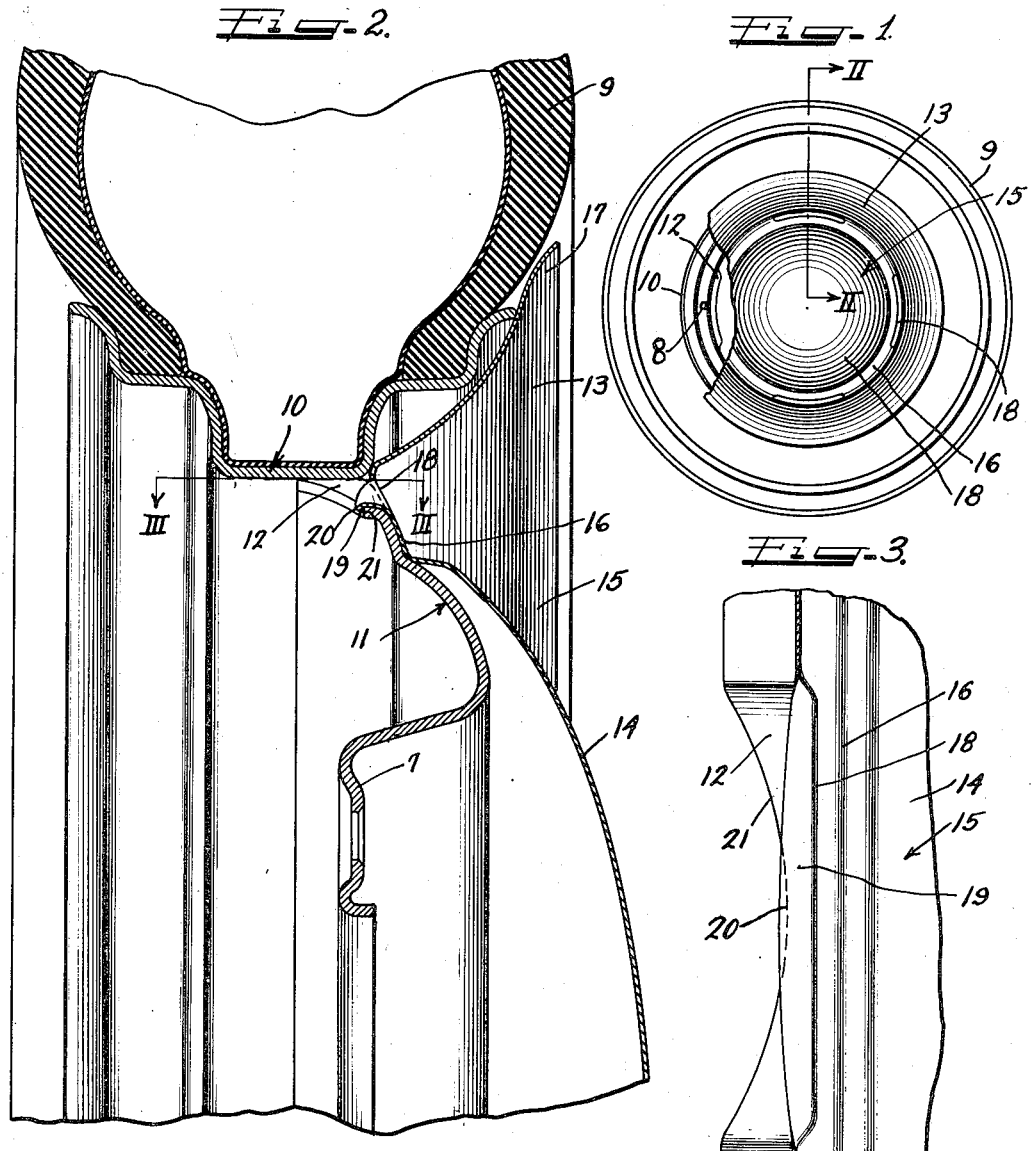
Inventor
GEORGE ALBERT LYON.
by Charles W. Hills Attys.

Patented Oct. 9, 1945

2,386,236

UNITED STATES PATENT OFFICE 2,386,236

WHEEL STRUCTURE

George Albert Lyon, Allenhurst, N. J.

Application July 12, 1943, Serial No. 494,304

5 Claims. (Cl. 301—37)

This invention relates to a wheel structure and more particularly to a novel wheel cover structure and retaining means therefor.

An object of this invention is to provide a simplified unitary one-piece wheel cover which embodies as integral components thereof retaining means resiliently deflectable into retaining engagement with a part of the wheel.

Another object of this invention is to provide a simplified form of plastic wheel cover which in itself possesses all of the necessary features for properly retaining the cover on the wheel and also for enabling easy removal of the cover from the wheel.

In accordance with the general features of this invention there is provided in a wheel structure including a multi-flanged tire rim part and a body part connected thereto, a circular cover for the wheel having an annular indented portion joining trim and hub cap sections of the cover and provided with punched-out spaced circularly arranged tangs or projections extending rearwardly from the indented portion and constructed and arranged to be resiliently pressed into openings in one of the parts of the wheel for retaining the cover on the wheel without requiring the use of any additional fastening means or any modification of the wheel structure.

Another feature of the invention relates to the forming of the tangs of such a construction that each of them has a curved lip which is adapted to be cammed over an edge of the body part in one of the wheel openings so as to overhang the rear edge of the wheel body part in the retention of the cover on the wheel.

Another feature of the invention relates to the provision of a one-piece unitary plastic tire cover including trim ring and hub cap sections joined together and having at their junction rearwardly projecting resilient lips for snap-on engagement with a part of the wheel.

Other objects and features of the invention will more fully appear from the following detailed description taken in connection with the accompanying drawing which illustrates a single embodiment thereof and in which:

Figure 1 is a side view of a wheel structure embodying the features of this invention and in which the cover is partly broken away to show the wheel body therebehind;

Figure 2 is an enlarged fragmentary cross-sectional view taken on the line II—II of Figure 1 looking in the direction indicated by the arrows;

Figure 3 is a fragmentary detailed view taken on substantially the line III—III of Figure 2 looking in the direction indicated by the arrows and being partly in section; and Figure 4 is a sectional view corresponding to a portion of Figure 2 and showing a modification.

As shown on the drawing:

The reference character 9 designates generally a conventional type of tire mounted in the usual drop-center type of multi-flanged tire rim designated by the reference character 10. This tire rim is mounted upon the usual wheel load bearing part of spider 11. More specifically the spider 11 is of a conventional dished construction and is preferably blanked from sheet metal. It is attached, as is the custom, at spaced intervals to the base flange of the rim 10 leaving openings 12 between the areas of attachment; these openings being for the purpose of affording ventilation of the brake drum (not shown) mounted usually to the rear of the spider. The spider, of course, at its center, as is shown in Figure 2, has the usual bolt-on flange 7 which is formed integral with the spider and by means of which the wheel is attached to a suitable support or axle.

Positioned over the outer side of the tire is a cover designated generally by the reference character 15 which embodies the features of this invention. The cover is of a unitary construction and embraces as components of it fastening means for detachably securing the cover on the wheel. The construction is such that no modification in the wheel structure is necessary in order for the proper securement of the cover in place on the wheel.

This wheel cover is made of a sheet material and may very nicely be made of a thermoplastic material such for example as ethyl cellulose. The material used, however, must have sufficient rigidity so that the cover will be self-sustaining with respect to its cross-sectional form but yet at the same time must be resiliently deflectable. The cover as illustrated embodies an outer trim ring section 13 and a central hub cap section 14 connected together by an intermediate depressed section 16, the outer annular or ring section 13 has a flared outer lip 17 by means of which the cover may be manually gripped for the purpose of pulling it off the wheel when it is desired to remove it. Also by reason of the resiliently deflectable characteristics of the material this lip portion may be engaged manually and the outer portion of the ring deflected slightly radially if it is desired to pull this portion slightly away from the wheel in order to afford access to the rear side of the same as for example, to get at the valve stem 8 shown in Figure 1. However, by reason of the fact that the cover is easily removable in toto the operator can, if he so desires, remove the cover to get at the valve stem rather than merely flex the outer lip portion.

The cross-sectional contour of the outer ring section 13 as well as its radial depth is such that this ring portion when in position gives the appearance of constituting a part of the side wall of the tire. This effect is enhanced by having the lip portion 17 extend beyond the rim and overlie the side wall of the tire. The effect may be further enhanced by giving the ring section 13 an external white finish and in that event the section appears to constitute a white side wall part of the tire 9.

It will of course be appreciated that the intermediate section 16 as well as the hub cap section 14 may be finished differently from the ring section 13 if it is so desired. Thus the contrasting color effects and areas are made possible with the form of cover I have disclosed.

The intermediate section 16 has punched from it at spaced areas arcuate or circular tangs 19 leaving arcuate openings 18 in the intermediate section 16. These tangs are bent rearwardly from the intermediate section 16 and each terminates in a lip 20 adapted to overhang the edge 21 of the wheel body part 11 at one of the openings 12. As best shown in Figure 3, the lip 20 may only be at the central portion of the tang 19 or in other words at a point where it will extend downwardly over the edge 21; the edge 21 being overlapped and shown in dotted lines in Figure 3.

In the application of the cover it is merely placed over the wheel rim and body and is then pressed axially inwardly until the tangs or projections 19 snap into retaining cooperation with the wheel part. To remove the cover as was noted before, all that is necessary is for the operator to grasp the turned edge 17 and pull the cover bodily from its engagement with the wheel. In this action the lip 20 by reason of the flexible character of the material from which it is made is easily cammed over and off of the edge 21 of the wheel body part.

The arcuate openings 18 in the intermediate section 16 are all arranged in a common circle due to the fact that the openings 12 are likewise in a common circle and give a very pleasing appearance to the wheel. Moreover, these openings being aligned with the wheel body openings 12 enable the circulation of air through the cover as well as through the openings 12.

In Figure 4 I have illustrated a modification of the invention wherein the wheel parts are identical to those of Figure 2 and the cover parts are likewise the same with the exception of the retaining tangs. In this form, the cover sections 13a and 14a of the plastic cover 15a have an intermediate indented section provided with circular spaced tangs 19a which are like tangs 19 but do not have their extremities formed into lips. Instead a separate ring 25, of either metal or plastic, is provided to fit in the indented intermediate portion of cover 15a and has spaced tangs 26 similar to tangs 19a arranged for nesting cooperation over tangs 19a in the openings formed in the cover by the punching of tangs therefrom. Each of the tangs 26 has its free extremity formed into a resilient lip 27 for overhanging edge 21 of wheel body 11 in the same way as in the case of lip 20 of the first form.

In applying this form of wheel trim to the wheel it is first pressed against the wheel to bring tangs 19a into the wheel openings 12. Thereafter, the ring 25, which is preferably of metal, is pressed into position in the indented section of the trim and its lips 27 are snapped over tangs 19a and into retaining engagement with edge 21 of the wheel body. This ring 25, not only serves as a retaining means, but also ornaments the cover or trim since it makes possible color contrasting areas and this is particularly true when it is given a highly lustrous external finish.

This form of cover is removed from the wheel in the same manner as in the case of the first form since the ring 25 will come off with the plastic cover 15a when the latter is pulled axially off the wheel.

In reapplying the cover to the wheel, it may be pressed with the ring 25 thereon against the wheel since lips 27 hold the ring on the plastic cover and merely flex over edge 21 as the cover is pressed home into retained engagement.

I claim as follows:

1. In a wheel structure including a wheel having a multi-flanged tire rim part and a body part connected thereto at spaced intervals leaving openings therebetween, a circular cover for said wheel having an annular indented portion provided with punched-out spaced circularly arranged tangs extending rearwardly from said indented portion and constructed and arranged to be resiliently pressed into said openings and into retaining engagement with one of said wheel parts, said cover including an annular outer trim section and a central hub cap section joined together at said indented portion, and being made of a plastic material having the property of being self-sustaining with respect to form and yet being resiliently deflectable without permanent deformation whereby said outer trim section may be manually pulled away from the wheel to afford access to the rear of said trim section, said hub cap section extending generally axially outwardly from the indented portion and said outer trim section extending axially and radially outwardly from the indented portion and being flexible relative to the indented section toward and from the wheel.

2. As an article of manufacture, a circular wheel cover made of plastic material and having an indented section provided with retaining fingers, said cover including an outer lip manually engageable to pull the cover and its fingers out of retained engagement with the wheel, said fingers being formed on a separate ring pressed into said indented section with said fingers extending through spaced apertures in the indented section.

3. As an article of manufacture, a circular wheel cover made of plastic material and having an indented section provided with retaining fingers, said cover including an outer lip manually engageable to pull the cover and its fingers out of retained engagement with the wheel, said fingers being formed on a separate ring pressed into said indented section with said fingers extending through spaced apertures in the indented section, said indented section having rearwardly extending tangs at said apertures and in nesting relation with said fingers.

4. As an article of manufacture, a circular wheel cover made of plastic material and having an indented section provided with retaining fingers, said cover including an outer lip manually engageable to pull the cover and its fingers out of retained engagement with the wheel, said fingers being formed on a separate ring pressed into said indented section with said fingers extending through spaced apertures in the indented section, each of said fingers having its rear extremity formed into a resilient lip for snap-on engagement with a part of the wheel.

5. As an article of manufacture, a circular wheel cover made of plastic material and having an indented section provided with retaining fingers, said cover including an outer lip manually engageable to pull the cover and its fingers out of retained engagement with the wheel, said fingers being formed on a separate ring pressed into said indented section with said fingers extending through spaced apertures in the indented section, said indented section having rearwardly extending tangs at said apertures and in nesting relation with said fingers, each of said fingers having its rear free extremity provided with a lip for overhanging a rear edge of a tang to hold the ring on the cover and for snap-on engagement with a part of the wheel.

GEORGE ALBERT LYON.